US010794435B2

(12) United States Patent
Fedullo et al.

(10) Patent No.: US 10,794,435 B2
(45) Date of Patent: Oct. 6, 2020

(54) TRANSMISSION WITH SELECTABLE ONE-WAY CLUTCH

(71) Applicant: Ford Global Technologies, LLC, Dearborn, MI (US)

(72) Inventors: Timothy Fedullo, Northville, MI (US); Abhay Mane, Windsor (CA); Bradley Dean Riedle, Northville, MI (US); Conor Edward Sullivan, Canton, MI (US); Stephen Michael Cicala, Dearborn Heights, MI (US); John Randall Armstead, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/253,257

(22) Filed: Jan. 22, 2019

(65) Prior Publication Data

US 2020/0032862 A1 Jan. 30, 2020

Related U.S. Application Data

(60) Provisional application No. 62/711,682, filed on Jul. 30, 2018.

(51) Int. Cl.
  *F16D 41/08* (2006.01)
  *F16H 61/02* (2006.01)
(52) U.S. Cl.
  CPC ......... *F16D 41/08* (2013.01); *F16H 61/0204* (2013.01); *F16H 2200/2041* (2013.01)
(58) Field of Classification Search
  CPC ............. F16D 41/08–088; F16D 47/04; F16H 61/0204; F16H 61/0246; F16H 61/04; F16H 61/0403; F16H 2061/0407; F16H 2061/044; F16H 2061/0462
  See application file for complete search history.

(56) References Cited

U.S. PATENT DOCUMENTS

| 7,491,151 | B2 * | 2/2009 | Maguire | B60W 10/02 477/107 |
| 8,100,804 | B2 | 1/2012 | Nishimine et al. | |
| 8,348,796 | B2 | 1/2013 | Samie et al. | |
| 8,718,887 | B1 * | 5/2014 | Bolenbaugh | G01M 13/02 701/67 |

(Continued)

*Primary Examiner* — Jacob S. Scott
(74) *Attorney, Agent, or Firm* — Vincent Mastrogiacomo; Brooks Kushman P.C.

(57) ABSTRACT

A transmission includes a selectable one-way clutch with an active state and a passive state. To avoid occupant discomfort and hardware damage, transitions from the passive state to the active state must only be commanded when no or very little slip is present across the selectable one-way clutch. Several methods are presented to eliminate slip, depending on vehicle speed. When the vehicle is stationary, full engagement of a clutch that causes slip to be proportional to vehicle speed eliminates slip. When the vehicle is moving backwards, partial engagement of the above clutch eliminates slip. When the vehicle is moving forwards, full engagement of all but one clutch of a tie-up condition and partial engagement of the remaining clutch of the tie-up condition brings the vehicle to a stop and eliminates slip.

12 Claims, 3 Drawing Sheets

(56) References Cited

U.S. PATENT DOCUMENTS

| | | | | |
|---|---|---|---|---|
| 8,886,423 | B1* | 11/2014 | Dlugoss | B60W 10/11 |
| | | | | 701/54 |
| 9,327,598 | B1* | 5/2016 | Lee | F16H 3/66 |
| 9,546,729 | B2 | 1/2017 | Bird et al. | |
| 9,689,442 | B2 | 6/2017 | Shioiri et al. | |
| 2008/0223681 | A1* | 9/2008 | Stevenson | B60W 20/00 |
| | | | | 192/43 |
| 2010/0063698 | A1* | 3/2010 | Lee | F16H 57/08 |
| | | | | 701/67 |
| 2012/0295756 | A1* | 11/2012 | Lee | F16H 3/66 |
| | | | | 475/289 |
| 2014/0121914 | A1* | 5/2014 | Neelakantan | F16H 61/0437 |
| | | | | 701/53 |
| 2014/0121916 | A1* | 5/2014 | Dlugoss | B60W 10/02 |
| | | | | 701/54 |
| 2015/0217733 | A1* | 8/2015 | Ries | B60W 10/10 |
| | | | | 192/219.5 |
| 2015/0307101 | A1 | 10/2015 | Ries et al. | |
| 2017/0159815 | A1* | 6/2017 | Kline | F16H 61/0213 |
| 2017/0276239 | A1* | 9/2017 | Lochocki, Jr. | F16H 61/0204 |
| 2018/0128328 | A1* | 5/2018 | Diaz | F16D 48/06 |

* cited by examiner

TRANSMISSION WITH SELECTABLE ONE-WAY CLUTCH

CROSS-REFERENCE TO RELATED APPLICATIONS

This application claims the benefit of U.S. provisional application Ser. No. 62/711,682 filed Jul. 30, 2018, the disclosure(s) of which is(are) hereby incorporated in its (their) entirety by reference herein.

TECHNICAL FIELD

This disclosure relates to the field of transmissions for motor vehicles. More particularly, the disclosure pertains to a transmission having a selectable one-way clutch and a method of operating the transmission to facilitate engagement of the selectable one-way clutch.

BACKGROUND

Many vehicles are used over a wide range of vehicle speeds, including both forward and reverse movement. Most types of internal combustion engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Many transmissions utilize friction clutches and brakes which are engaged in different combinations to establish different power flow paths having different speed ratios. One type of commonly used friction clutch is a wet multi-plate clutch. A clutch pack includes a set of friction plates splined to one component and interleaved with a set of separator plates splined to a different component. To engage the clutch, pressurized fluid is supplied to an apply chamber forcing a piston to squeeze the friction plates between the separator plates. Friction between the friction plates and separator plates prevents relative rotation, thereby coupling the two components to each other. When the fluid pressure is reduced, a return spring forces the piston away from the clutch pack removing the normal force such that relative rotation is possible, albeit with some parasitic drag.

Transmissions may also use one-way clutches that passively prevent relative rotation between two components in one direction while permitting relative rotation in the opposite direction. An actively controlled one-way clutch includes selectable states such as permitting relative rotation in both directions or preventing relative rotation in both directions.

SUMMARY OF THE DISCLOSURE

A transmission includes a selectable one-way clutch, a first friction clutch, and a controller. The first friction clutch is configured such that slip across the selectable one-way clutch is proportional to a speed of an output element whenever the first friction clutch is fully engaged. The controller is programmed to switch the selectable one-way clutch from a passive state to an active state by commanding engagement of the first friction clutch then commanding the selectable one-way clutch to the active state after confirming that slip is less than a threshold. The controller may switch the selectable one-way clutch from the passive state to the active state in response to driver selection of a Reverse mode. Commanding engagement of the first friction clutch may include commanding partial engagement of the first friction clutch in response to the speed of the output element being less than zero or commanding full engagement of the first friction clutch in response to the speed of the output element being greater than or equal to zero. Additional friction clutches may be engaged to establish an output tie-up condition or a full tie-up condition.

A transmission includes a selectable one-way clutch and a controller. The controller is programmed to respond to driver selection of a Reverse mode by fully engaging a first friction clutch and switching the selectable one-way clutch from a passive state to an active state. Engagement of the first friction clutch establishes a condition in which slip across the selectable one-way clutch is proportional to an output element speed. The controller switches the selectable one-way clutch after confirming that slip is less than a threshold. In response to the output element speed being positive, the controller may partially engage a second friction clutch after engaging the first friction clutch and before switching the selectable one-way clutch, to establish an output tie-up condition. After switching the selectable one-way clutch, the controller may engage a second friction clutch and release the first friction clutch to establish a reverse gear state. Alternatively, in response to the output element speed being positive, the controller may fully engage a second friction clutch before switching the selectable one-way clutch, wherein full engagement of the first and second clutches establishes a first reverse gear state. After switching the selectable one-way clutch, the controller may engage a third friction clutch and release the first and second friction clutches to establish a second reverse gear state.

A transmission includes a selectable one-way clutch and a controller. The controller is programmed to respond to driver selection of a Reverse mode while slip across the one-way clutch exceeds a threshold by engaging first and second friction clutches and then switching the state of the selectable one-way clutch from a passive state to an active state. Engaging the first and second friction clutches reduces the slip. The controller confirms that slip is less than the threshold before switching the selectable one-way clutch state. Full engagement of the first and second clutches may establish an output tie-up condition which is not necessarily a full tie-up condition. Alternatively, full engagement of the first and second clutches may establish a first reverse gear state.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of elements are fixedly coupled to one another if they are constrained to rotate at the same speed and about the same axis in all operating conditions. Elements may be fixedly coupled by, for example, spline connections, welding, press fitting, or machining from a common solid. Slight variations in rotational displacement between fixedly coupled elements can occur such as displacement due to spline lash or shaft compliance. In contrast, two elements are selectively coupled by a shift element when the shift element constrains them to rotate at the same speed about the same axis whenever the shift element is fully engaged and the two elements are free to have distinct speeds in at least some other operating condition. Two elements are coupled if they are either fixedly coupled or selectively coupled. Shift elements include actively controlled devices such as hydraulically or electrically actuated clutches and passive devices such as one way clutches. A shift element may couple rotating elements using friction or may create a positive engagement such as interlocking teeth. A shift element that holds a rotable element against rotation by selectively coupling the rotable element to the housing may be called a brake.

Two rotatable elements are drivably connected if a power flow path conveys power from one to the other and constrains the rotational velocities to be proportional in all operating conditions. Drivably connected elements do not necessarily rotate about the same axis as one another. Rotatable elements may be drivably connected to one another by, for example, shafts, meshing gears, sprockets and chains, or various combinations of these.

Figure 1:
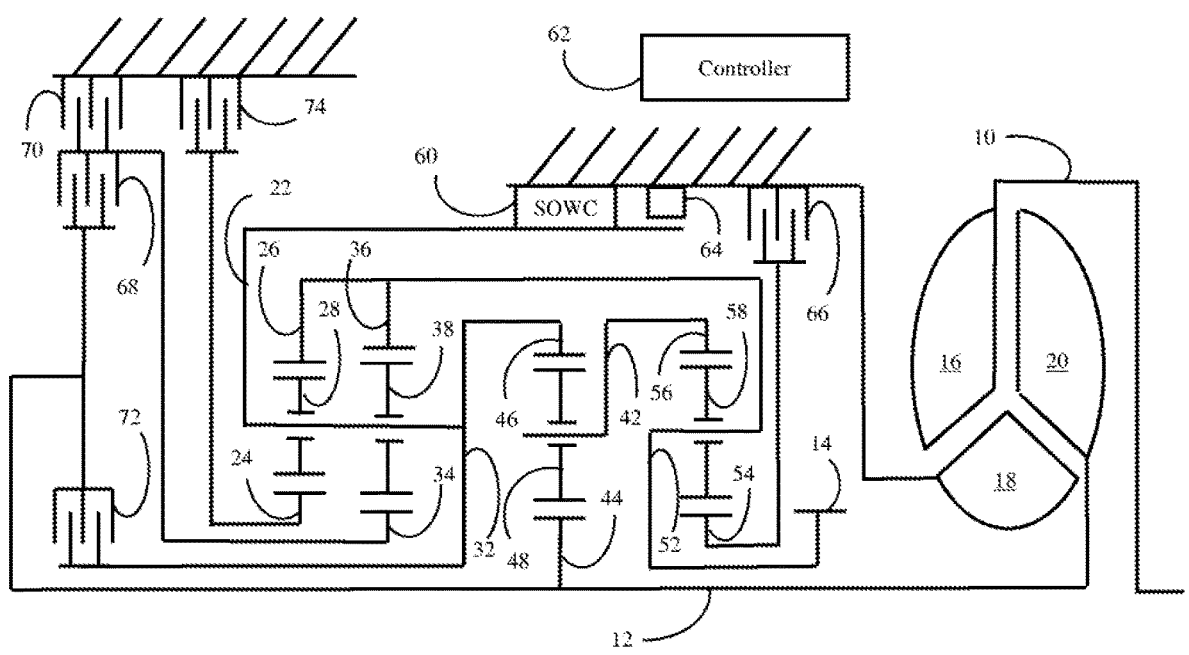
FIG. 1 is a schematic diagram of an automotive transmission.

FIG. 1 is a schematic diagram of a transmission gearbox and torque converter. Only the top half of the gearbox and torque converter are shown because most of the components are axisymmetric. A transmission input shaft 10 is driveably connected to a power source such as an internal combustion engine. Power is transferred from transmission input shaft 10 to turbine shaft 12 by the torque converter. Power is then transferred from the turbine shaft 12 to an output element 14 by the gearbox. Power is transferred from output element 14 to vehicle driving wheels via a final drive mechanism, differential, and axle (not shown). Although power flows primarily from the engine to the driving wheels, there are some operating conditions, such as coasting on downhill grades, in which power flows in the opposite direction.

The torque converter includes an impeller 16, a stator 18, and a turbine 20. The impeller is fixed to input shaft 10. The stator 18 is attached to the transmission case via a one-way clutch. The turbine 20 is fixed to turbine shaft 12. Impeller 16 acts as a centrifugal pump propelling fluid in a toroidal pattern. When the impeller speed exceeds the turbine speed, the flowing fluid encounters blades of the turbine imparting a torque on the turbine. The stator 18 redirects the flow exiting the turbine and directs it back into the impeller. When the impeller spins substantially faster than the turbine, the torque exerted on the turbine is a multiple of the torque exerted by the impeller. The torque converter allows the engine to rotate and exert torque on the turbine shaft even when the turbine shaft is stationary or moving backwards. This characteristic is very useful for initiating vehicle movement from a standstill.

The gearbox includes four simple planetary gearsets, each having carriers 22, 32, 42, and 52; sun gears 24, 34, 44, and 54; ring gears 26, 36, 46, and 56; and planet gears 28, 38, 48, and 58. The sun gears, ring gears, and carriers are all supported for rotation about a central axis. Each planet gear is supported for rotation with respect to the respective carrier and meshes with the respective sun gear and ring gear. Turbine shaft 12 is fixedly coupled to sun gear 44. Output element 14 is fixedly coupled to carrier 52, ring gear 26, and ring gear 36. Carrier 22, carrier 32, and ring gear 46 are mutually fixedly coupled. Carrier 42 is fixedly coupled to ring gear 56.

The gearbox also includes five friction clutches and one selectable one-way clutch. Each clutch selectively couples two elements. In this document, the term clutch includes devices that selectively couple a rotatable element to the transmission case, sometimes called brakes. When a clutch is in an engaged state, torque may be transmitted from one of the two elements to the other selectively coupled element. When a clutch is in a fully engaged state, the rotational speeds of the two elements are constrained to be equal. A friction clutch may be in a partially engaged state in which the speeds are not equal but torque is transferred between the elements. When a clutch is in a disengaged state, the element speeds may differ and only parasitic drag torque is transferred.

Selectable one-way clutch (SOWC) 60 selectively couples carriers 22 and 32 and ring gear 46 to the transmission case. SOWC 60 has a passive state and an active state. In the passive state, relative rotation is prevented in one direction but allowed in the opposite direction. The disengaged state on SOWC 60 may be referred to as an overrunning state. In the active state, SOWC 60 prevents relative rotation in both directions. In other words, in the active state, it is always fully engaged. Unlike a friction clutch, SOWC 60 is not designed to operate in a partially engaged state. When SOWC 60 transitions from the passive state to the active state, any relative rotation is suddenly eliminated, which can create uncomfortable sensations for vehicle occupants and may cause component failures. Therefore, the transmission controller 62 is programmed not to command such a transition unless the slip across SOWC 60 is very low (less than 20 rpm). The slip may be measured by a speed sensor 64. Alternatively, the slip may be calculated based on other speed sensors. SOWC 60 may not respond to a command to switch from active state to passive state while it is transmitting torque against the direction in which rotation would be allowed in passive state. Therefore, controller 62 needs to relieve such torque before commanding such a transition.

Friction clutch 66 selectively couples sun gear 54 to the transmission case. Friction clutch 68 selectively couples turbine shaft 12 to sun gear 34. Friction clutch 70 selectively couples sun gear 34 to the transmission case. Friction clutch 72 selectively couples turbine shaft 12 to carrier 22, carrier 32, and ring gear 46. Friction clutch 74 selectively couples sun gear 24 to the transmission case. Various speed ratios between turbine shaft 12 and output element 14 are established by fully engaging the clutches in combinations of two as shown in TABLE 1.

TABLE 1

| | 66 | 68 | 70 | 60 | 72 | 74 | Speed Ratio |
|---|---|---|---|---|---|---|---|
| $1^{st}$ | X | | | Passive | | | 4.484 |
| 1M | X | | | Active | | | 4.484 |
| $2^{nd}$ | X | | | | | X | 3.146 |
| $3^{rd}$ | X | | X | | | | 2.872 |
| $4^{th}$ | X | X | | | | | 1.842 |
| $5^{th}$ | X | | | | X | | 1.414 |
| $6^{th}$ | | X | | | X | | 1.000 |
| $7^{th}$ | | | X | | X | | 0.742 |
| $8^{th}$ | | | | | X | X | 0.616 |
| Reverse | | X | | Active | | | −2.882 |

The speed ratio is the same in $1^{st}$ gear and in 1M. However, in $1^{st}$ gear, the transmission only transmits torque from the engine to the vehicle wheels. If the driver releases the accelerator pedal while coasting forward, SOWC 60 will overrun and the engine speed will fall to idle. In the 1M gear state, on the other hand, SOWC 60 is in the ACTIVE state, so torque can be transmitted from the vehicle wheels to the engine resulting in engine braking. In Reverse, SOWC 60 must be in the active state in order to transmit power from the engine to the vehicle wheels.

In Park, a parking pawl is engaged to hold the vehicle stationary. Unlike friction clutches 66-74, the parking pawl is designed to remain engaged indefinitely without power consumption. In some vehicles, the parking pawl may be mechanically linked to the shift selector. In other vehicles, it may be under the control of controller 62. In either case, there may be sensors which indicate the current status of the parking pawl to controller 62.

Figure 2:
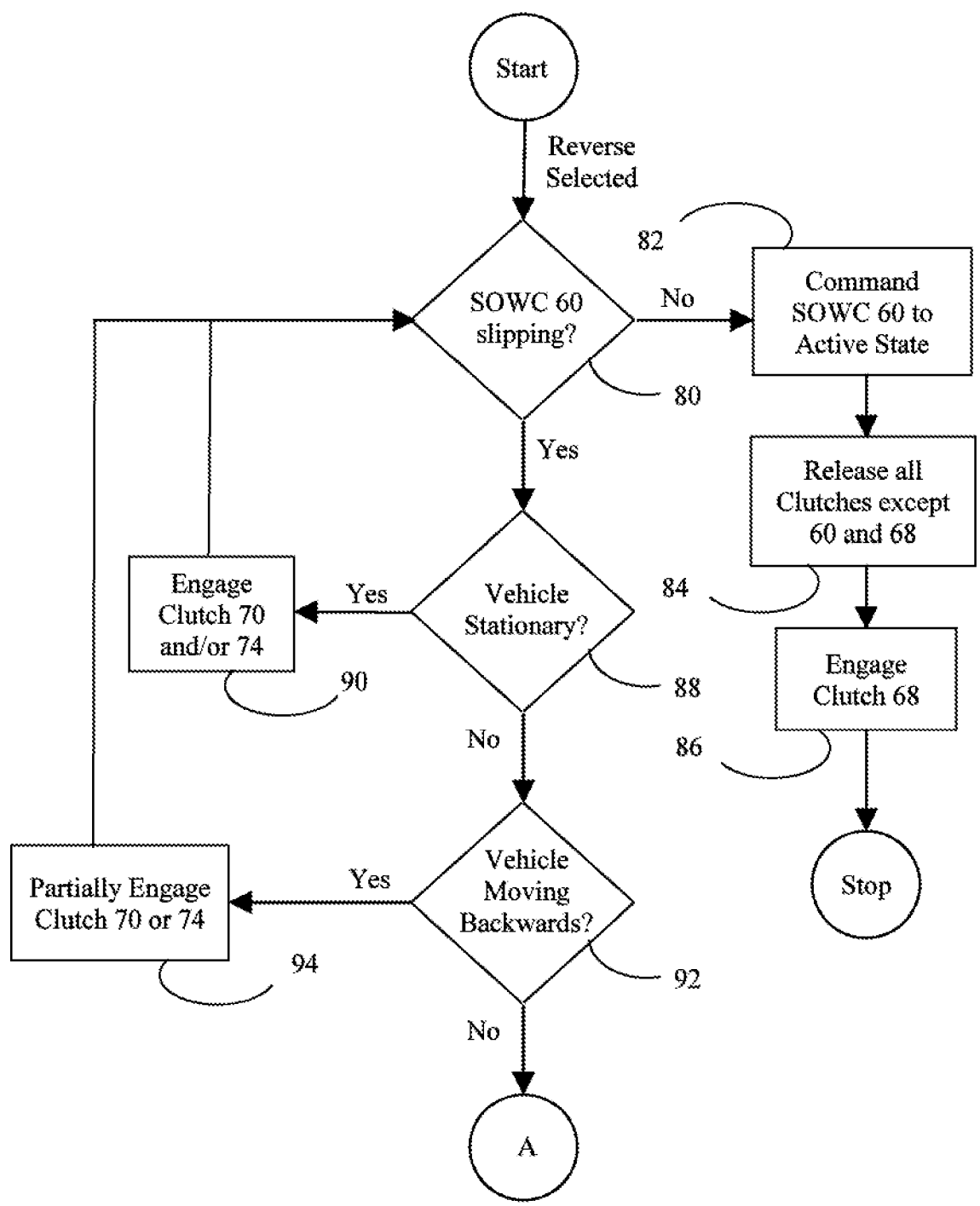
FIG. 2 is a flowchart illustrating a first part of a process for engaging a reverse gear state in the automotive transmission of FIG. 1.
Figure 3:
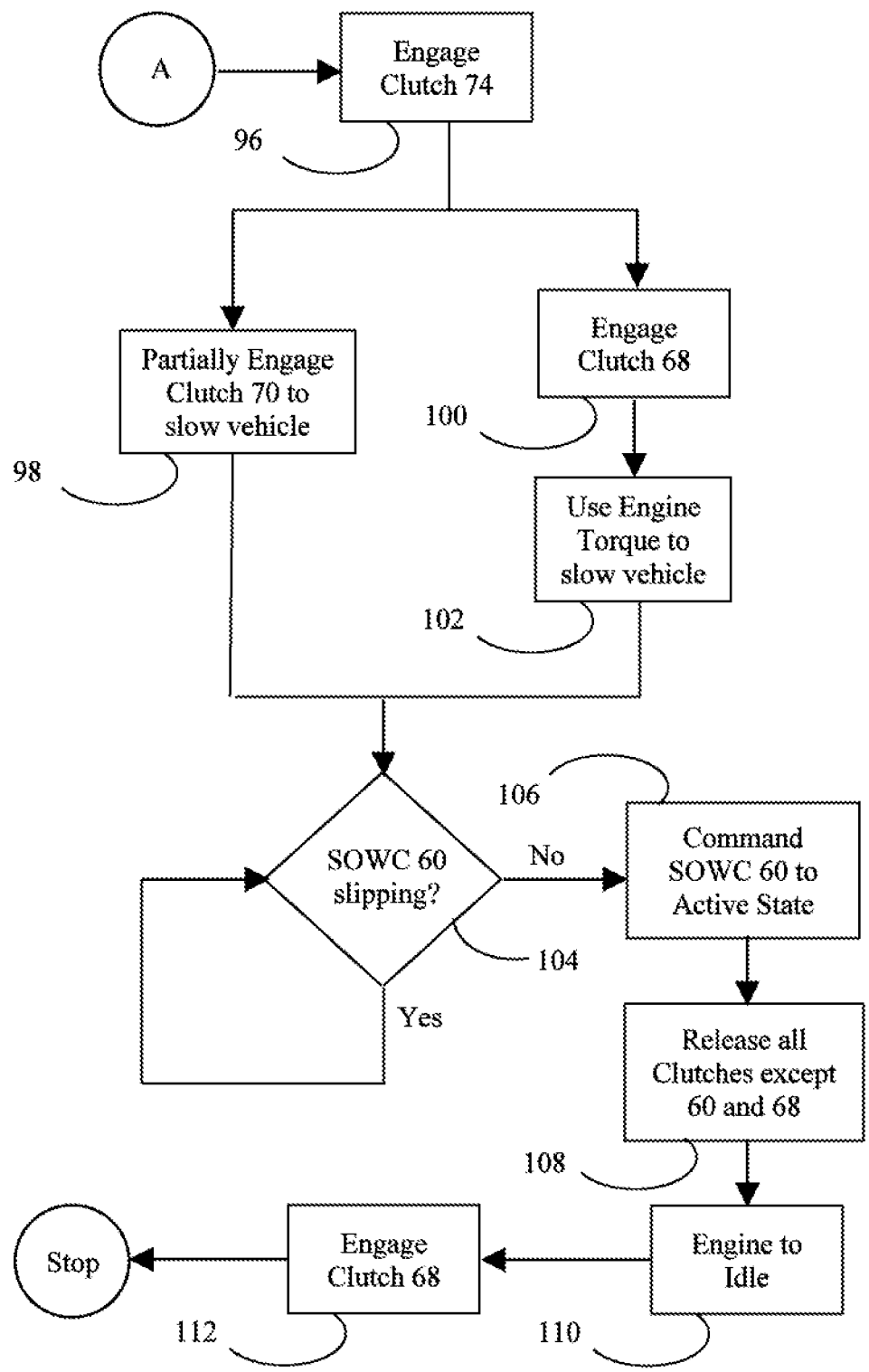
FIG. 3 is a flowchart illustrating a second part of a process for engaging a reverse gear state in the automotive transmission of FIG. 1.

FIGS. 2 and 3 illustrate a process for engaging the Reverse gear state. When engaging the Reverse gear state, it is important to ensure that the slip across SOWC 60 is near zero prior to commanding it to transition into the active state. The process is initiated when a driver commands Reverse. At 80, the controller checks whether or not SOWC 60 is slipping. When the previous gear state is $1^{st}$ gear and the vehicle speed is negligible, the slip will generally already be zero when Reverse is commanded. If the slip is zero at 80, then SOWC 60 is commanded into active state at 82. Engagement of Reverse is completed by releasing all clutches other than those involved in Reverse at 86 and engaging clutch 68 at 86.

There are a number of situations in which SOWC 60 would be slipping when Reverse gear is commanded. For example, when the previous gear state is Neutral or Park, all of the friction clutches may be released. With negligible resistance against turbine shaft 12, the turbine shaft 12 attains a speed close to the speed of the engine crankshaft. The speeds of other transmission elements will depend on the relative parasitic drag among components. For example, parasitic drag of clutch 68 will tend to accelerate sun gear 34 toward the speed of turbine shaft 12. Carrier 32 will then assume a speed between that of sun gear 32 and ring gear 36 (which is tied to output element 14). Even if the previous gear state is Drive, if the vehicle is in a gear higher than $1^{st}$ gear or coasting at a sufficient forward speed, SOWC 60 will be in an overrunning condition.

If SOWC 60 is slipping at 80, the controller checks at 88 whether or not the vehicle is stationary. If the vehicle is stationary at 88, the controller engages at least one of clutches 70 and 74 at 90. Full engagement of either of these clutches has the effect of making the speed of carrier 22/32 proportional to the speed of the vehicle. Since the speed of the vehicle is zero in this condition, the speed of carrier 22/32 becomes zero, eliminating any slip across SOWC 60. Control then passes back to 80, which confirms that the commanded engagement of clutch 70 and/or 74 successfully eliminated the slip across SOWC 60 before the remaining steps of engaging reverse are completed.

If the vehicle is not stationary at 88, the controller checks at 92 whether the vehicle is rolling backwards. If the vehicle is rolling backwards, the controller commands partial engagement of clutch 70 or 74. Note that backwards vehicle movement implies that ring gears 26 and 36 have a negative rotational speed. Also note that slip across SOWC 60 implies that carrier 22/32 must have a positive rotational speed. Therefore, based on the speed relationships imposed by simple planetary gearsets, sun gears 24 and 34 each have positive speeds greater than the speed of carrier 22/32. Partially engaging clutch 70 tends to slow sun gear 24. Similarly, partially engaging clutch 74 tends to slow sun gear 34. As the sun gears slow with the ring gears rotating backwards, carrier 22/32 reaches zero speed before the sun gears reach zero speed. The method loops through steps 80, 88, 92, and 94 until the condition of zero slip is detected. Once zero slip is detected at 80, the remaining steps of engaging reverse are completed. A full engagement of either clutch 70 or 74 in this condition would have the effect of not only eliminating slip across SOWC 60 but also of stopping the backwards movement of the vehicle. When the driver has selected Reverse, backwards movement of the vehicle is presumably desired. Controlled partial engagement of clutches 70 or 74 limits forward output torque.

If the vehicle is not rolling backwards at 92, control proceeds to the flowchart of FIG. 3. The vehicle must be moving forward. This situation may arise, for example, if the driver selected Reverse while moving relatively fast in Drive, if the driver selected Neutral during a transition from Drive to Reverse while moving forward, or if the vehicle starts to roll forward due to a downhill road grade while in Neutral. At 96, clutch 74 is engaged. As discussed earlier, this has the effect of making SOWC slip proportional to the speed of the output element 14. However, when the output element has positive speed, that is not sufficient to eliminate the slip. FIG. 3 illustrates two methods of eliminating the slip by bringing the vehicle to a stop. Either of these methods may be used or they may be used in combination.

One method of slowing the vehicle is to partially engage clutch 70 as shown at 98. Note that engagement of clutches 70 and 74 together is an output tie-up state. An output tie-up state is any clutch application condition in which the output element 14 is held stationary. At least partially engaging all of the clutches of an output tie-up state has the effect of braking the vehicle. Preferably, all but one of the clutches of the output tie-up state are fully engaged while a final one of the clutches of the output tie-up state is partially engaged in a controlled manner. In the flowchart if FIG. 3, clutch 74 is fully engaged and clutch 70 is partially engaged, but fully engaging clutch 70 and partially engaging clutch 74 would have the same braking effect. The partially engaged clutch will absorb energy during this maneuver. The choice of which clutch to partially engage may depend upon which clutch is designed with the most energy capacity and on an estimate of initial clutch temperature.

A second method of slowing the vehicle is illustrated at 100 and 102 in FIG. 3. At 100, clutch 68 is fully engaged. The combination of clutches 68 and 74 produce an alternative reverse gear state, not involving SOWC 60. Once this alternative reverse gear state is established at 100, engine torque acts to slow the vehicle at 102. Note that the torque ratio between turbine shaft 12 and output element 14 is much lower than the primary reverse gear state. Therefore, engine torque is not as effective in slowing the vehicle as it would be if the primary gear state is established. As a result, it may be necessary to command engine torque in excess of what the driver is commanding via the accelerator pedal.

When the two methods are used together, clutches 68, 70, and 74 are all at least partially engaged. This combination of three clutches is a full tie-up state. A full tie-up state is any clutch application condition in which all rotatable elements of the gearbox are held stationary. Many other full tie-up states exist. Any full tie-up state is also an output tie-up state.

At 104, the controller waits for the slip across SOWC to decrease below a threshold. While waiting, controlled partial engagement of clutch 70 and/or controlled engine torque continue. Once the slip has been eliminated at 104, SOWC 60 is commanded to the Active state at 106. Then, all clutches that are not part of the primary reverse state are released at 108. If engine power had been increased during the process, it is returned to idle at 110. At 112, clutch 68 is engaged to complete establishment of the primary reverse gear state.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
    a selectable one-way clutch;
    a first friction clutch configured such that slip across the selectable one-way clutch is proportional to a speed of an output element whenever the first friction clutch is fully engaged;
    a second friction clutch; and
    a controller programmed to switch the selectable one-way clutch from a passive state to an active state in response to driver selection of a Reverse mode by commanding engagement of the first friction clutch then commanding the selectable one-way clutch to the active state after confirming that slip is less than a threshold, such that full engagement of the first and second clutches establishes a first reverse gear state, and
    after switching the selectable one-way clutch, engaging a third friction clutch and releasing the first and second friction clutches establishes a second reverse gear state.

2. The transmission of claim 1 wherein commanding engagement of the first friction clutch comprises commanding partial engagement of the first friction clutch in response to the speed of the output element being less than zero.

3. The transmission of claim 1 wherein commanding engagement of the first friction clutch comprises commanding full engagement of the first friction clutch in response to the speed of the output element being greater than or equal to zero.

4. The transmission of claim 3 wherein full engagement of the first and second clutches together establishes an output tie-up condition, and wherein the controller is further programmed, in response to speed of the output element being greater than zero, to command partial engagement of the second clutch to reduce the speed of the output element.

5. The transmission of claim 3 wherein the first, second, and third clutches are configured such that full engagement of the first, second, and third clutches together establishes a full tie-up condition, and wherein the controller is further programmed, in response to speed of the output element being greater than zero, to command full engagement of the second clutch and partial engagement of the third clutch to reduce the speed of the output element.

6. A transmission comprising:
    a selectable one-way clutch; and
    a controller programmed to
        respond to driver selection of a Reverse mode by
            fully engaging a first friction clutch such that slip across the selectable one-way clutch is proportional to an output element speed, and
            switching the selectable one-way clutch from a passive state to an active state after confirming that slip is less than a threshold, and
        in response to the output element speed being positive, fully engage a second friction clutch before switching the selectable one-way clutch, full engagement of the first and second clutches establishing a first reverse gear state, and, after switching the selectable one-way clutch, engage a third friction clutch and release the first and second friction clutches to establish a second reverse gear state.

7. The transmission of claim 6 wherein the controller is further programmed to, in response to the output element speed being positive, partially engage the second friction clutch after engaging the first friction clutch and before switching the selectable one-way clutch, to establish an output tie-up condition.

8. The transmission of claim 7 wherein the output tie-up condition is not a full tie-up condition.

9. The transmission of claim 6 wherein the controller is further programmed to, after switching the selectable one-way clutch, engage the second friction clutch and release the first friction clutch to establish a reverse gear state.

10. A transmission comprising:
    a selectable one-way clutch; and
    a controller programmed to respond to driver selection of a Reverse mode while slip across the one-way clutch exceeds a threshold by
        engaging first and second friction clutches to reduce the slip, and
        switching the selectable one-way clutch from a passive state to an active state after confirming that slip is less than the threshold, wherein full engagement of the first and second clutches establishes a first reverse gear state, and
        after switching the selectable one-way clutch, engaging a third friction clutch and releasing the first and second friction clutches to establish a second reverse gear state.

11. The transmission of claim 10 wherein full engagement of the first and second clutches would establish an output tie-up condition.

12. The transmission of claim 11 wherein the output tie-up condition is not a full tie-up condition.

\* \* \* \* \*